(12) United States Patent
Mataga et al.

(10) Patent No.: US 9,992,284 B2
(45) Date of Patent: Jun. 5, 2018

(54) DATACASTING SYSTEM WITH INTERMITTENT LISTENER CAPABILITY

(71) Applicant: Roundbox, Inc., Forham Park, NJ (US)

(72) Inventors: Peter Andrew Mataga, Sparta, NJ (US); Igor Slepchin, Caldwell, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 221 days.

(21) Appl. No.: 14/618,948

(22) Filed: Feb. 10, 2015

(65) Prior Publication Data

US 2016/0006816 A1   Jan. 7, 2016

Related U.S. Application Data

(63) Continuation of application No. 13/648,635, filed on Oct. 10, 2012, now Pat. No. 8,953,627, which is a (Continued)

(51) Int. Cl.
*H04N 21/262* (2011.01)
*H04L 29/08* (2006.01)
(Continued)

(52) U.S. Cl.
CPC .......... *H04L 67/125* (2013.01); *H04H 60/06* (2013.01); *H04L 47/10* (2013.01); *H04L 47/782* (2013.01); *H04L 67/04* (2013.01); *H04L 67/2861* (2013.01); *H04L 67/2895* (2013.01); *H04L 67/42* (2013.01); *H04N 21/262* (2013.01)

(58) Field of Classification Search
None
See application file for complete search history.

(56) References Cited

U.S. PATENT DOCUMENTS

| 4,893,347 A | 1/1990 | Eastmond et al. |
| 4,893,349 A | 1/1990 | Eastmond et al. |

(Continued)

FOREIGN PATENT DOCUMENTS

| WO | WO 2007085551 A1 * | 8/2007 | ............ H04N 7/163 |
| WO | 2008093208 | 8/2008 | |

OTHER PUBLICATIONS

Venkatesan et al., "IEEE 802 Tutorial: Video over 802.11", Mar. 2007.*

(Continued)

*Primary Examiner* — Shirley Zhang
(74) *Attorney, Agent, or Firm* — Kilpatrick Townsend & Stockton LLP

(57) ABSTRACT

A server-client system or architecture that allows datacast applications to reliably transport data objects from a network server over a unidirectional packet network ("datacast network") to one or more clients, each of which may be listening to the packet stream at different times. The invention allows the clients to listen intermittently to the datacast, yet still receive all of the data objects published by the server in a timely manner, and in a way that is more optimal in terms of client resource use. This ensures that listening clients can receive a complete set of the data objects broadcast while being able to conserve client processing and power resources by not requiring continuous listening by the client to the datacast.

20 Claims, 6 Drawing Sheets

Related U.S. Application Data continuation of application No. 12/436,706, filed on May 6, 2009, now Pat. No. 8,311,048.

(60) Provisional application No. 61/052,163, filed on May 9, 2008.

(51) Int. Cl.
*H04L 12/801* (2013.01)
*H04H 60/06* (2008.01)
*H04L 12/911* (2013.01)
*H04L 29/06* (2006.01)

(56) References Cited

U.S. PATENT DOCUMENTS

| | | |
|---|---|---|
| 5,063,610 A | 11/1991 | Alwadish |
| 5,119,503 A | 6/1992 | Mankovitz |
| 5,119,507 A | 6/1992 | Mankovitz |
| 5,134,719 A | 7/1992 | Mankovitz |
| 5,161,251 A | 11/1992 | Mankovitz |
| 5,214,792 A | 5/1993 | Alwadish |
| 5,726,984 A | 3/1998 | Kubler et al. |
| 5,790,536 A | 8/1998 | Mahany et al. |
| 5,828,653 A | 10/1998 | Goss |
| 6,058,289 A | 5/2000 | Gardner et al. |
| 6,078,251 A | 6/2000 | Landt et al. |
| 6,198,728 B1 | 3/2001 | Hulyalkar et al. |
| 6,332,133 B1 | 12/2001 | Takayama |
| 6,389,010 B1 | 5/2002 | Kubler et al. |
| 6,396,816 B1 | 5/2002 | Astle et al. |
| 6,414,960 B1 | 7/2002 | Kuhn et al. |
| 6,442,138 B1 | 8/2002 | Yin et al. |
| 6,513,069 B1 | 1/2003 | Abato et al. |
| 6,697,365 B1 | 2/2004 | Messenger |
| 6,850,252 B1 | 2/2005 | Hoffberg |
| 6,917,976 B1 | 7/2005 | Slaughter et al. |
| 6,940,813 B2 | 9/2005 | Ruutu |
| 7,020,701 B1 | 3/2006 | Gelvin et al. |
| 7,058,376 B2 | 6/2006 | Logan et al. |
| 7,126,945 B2 | 10/2006 | Beach |
| 7,188,251 B1 | 3/2007 | Slaughter et al. |
| 7,231,221 B2 | 6/2007 | Assarsson et al. |
| 7,277,457 B2 | 10/2007 | Gorday et al. |
| 7,340,615 B2 | 3/2008 | Krantz et al. |
| 7,502,604 B2 | 3/2009 | Knox |
| 7,552,246 B2 | 6/2009 | Mahany et al. |
| 7,555,306 B2 | 6/2009 | Liu |
| RE40,836 E | 7/2009 | Mankovitz |
| 7,574,231 B2 | 8/2009 | Matsubara |
| 7,583,639 B2 | 9/2009 | Mahany |
| 7,610,373 B2 | 10/2009 | Hasti et al. |
| 7,616,942 B2 | 11/2009 | Karl et al. |
| 7,639,681 B2 | 12/2009 | Kelly et al. |
| 7,664,697 B2 | 2/2010 | Takayama |
| 7,715,375 B2 | 5/2010 | Kubler et al. |
| 7,756,082 B1 | 7/2010 | Dhamdhere |
| 7,760,649 B2 | 7/2010 | Song |
| 7,813,822 B1 | 10/2010 | Hoffberg |
| 7,881,755 B1 | 2/2011 | Mishra et al. |
| 7,974,714 B2 | 7/2011 | Hoffberg |
| 8,102,864 B2 | 1/2012 | Khivesara et al. |
| 8,127,041 B2 | 2/2012 | Leung et al. |
| 8,149,771 B2 | 4/2012 | Khivesara et al. |
| 8,201,208 B2 | 6/2012 | Delpuch et al. |
| 8,219,134 B2 | 7/2012 | Maharajh et al. |
| 8,311,048 B2 | 11/2012 | Mataga et al. |
| 8,325,747 B2 | 12/2012 | Khivesara et al. |
| 8,360,975 B1 | 1/2013 | Schwieterman et al. |
| 8,423,660 B2 | 4/2013 | Leung et al. |
| 8,953,627 B2 | 2/2015 | Mataga et al. |
| 9,681,161 B2 * | 6/2017 | Gonder .............. H04N 21/2385 |
| 2002/0059645 A1 * | 5/2002 | Soepenberg ......... H04N 5/4401 |
| | | 725/137 |
| 2002/0098813 A1 | 7/2002 | Likourezos et al. |
| 2002/0194121 A1 | 12/2002 | Takayama |
| 2002/0194601 A1 | 12/2002 | Perkes et al. |
| 2003/0048805 A1 | 3/2003 | Yoshihara et al. |
| 2003/0110503 A1 | 6/2003 | Perkes |
| 2004/0013089 A1 | 1/2004 | Taneja et al. |
| 2004/0076155 A1 | 4/2004 | Yajnik et al. |
| 2004/0151114 A1 | 8/2004 | Ruutu |
| 2004/0153545 A1 | 8/2004 | Pandya et al. |
| 2005/0071882 A1 | 3/2005 | Rodriguez et al. |
| 2005/0091679 A1 | 4/2005 | Tanaka et al. |
| 2005/0111462 A1 | 5/2005 | Walton et al. |
| 2005/0120378 A1 | 6/2005 | Jalonen |
| 2005/0221869 A1 * | 10/2005 | Liu .................. G06F 1/3209 |
| | | 455/574 |
| 2005/0281270 A1 | 12/2005 | Kossi et al. |
| 2005/0286546 A1 * | 12/2005 | Bassoli ............... G11B 27/002 |
| | | 370/432 |
| 2006/0031467 A1 | 2/2006 | Hasti et al. |
| 2006/0248090 A1 * | 11/2006 | Bennett ............ H04L 29/06027 |
| 2007/0033239 A1 | 2/2007 | Beaule et al. |
| 2007/0053513 A1 | 3/2007 | Hoffberg |
| 2007/0054613 A1 | 3/2007 | Matsubara |
| 2007/0054739 A1 | 3/2007 | Amaitis et al. |
| 2007/0105548 A1 | 5/2007 | Mohan et al. |
| 2007/0127478 A1 * | 6/2007 | Jokela ................ H04L 12/1881 |
| | | 370/390 |
| 2007/0180119 A1 | 8/2007 | Khivesara et al. |
| 2007/0232366 A1 * | 10/2007 | Chen ................. H04W 52/0216 |
| | | 455/574 |
| 2007/0240188 A1 | 10/2007 | Vermola et al. |
| 2007/0281623 A1 | 12/2007 | Liu |
| 2007/0297438 A1 * | 12/2007 | Meylan ............ H04W 52/0225 |
| | | 370/445 |
| 2008/0022294 A1 | 1/2008 | Perrin et al. |
| 2008/0101460 A1 | 5/2008 | Rodriguez |
| 2008/0151814 A1 * | 6/2008 | Jokela ................... H04W 74/04 |
| | | 370/328 |
| 2008/0200154 A1 | 8/2008 | Maharajh et al. |
| 2008/0207137 A1 | 8/2008 | Maharajh et al. |
| 2008/0207182 A1 | 8/2008 | Maharajh et al. |
| 2008/0287058 A1 | 11/2008 | Nahm et al. |
| 2009/0025027 A1 | 1/2009 | Craner |
| 2009/0077609 A1 * | 3/2009 | Bichot ............. H04N 21/23106 |
| | | 725/127 |
| 2009/0083420 A1 | 3/2009 | Becker et al. |
| 2009/0103632 A1 * | 4/2009 | Choi ..................... H04L 65/601 |
| | | 375/240.25 |
| 2009/0158366 A1 * | 6/2009 | Houdaille ........... H04L 12/1886 |
| | | 725/109 |
| 2009/0182886 A1 | 7/2009 | McCartie et al. |
| 2009/0196226 A1 * | 8/2009 | Shibao .................. H04H 40/09 |
| | | 370/328 |
| 2009/0313383 A1 | 12/2009 | Leung et al. |
| 2010/0037262 A1 | 2/2010 | Heuer |
| 2010/0061388 A1 | 3/2010 | Mataga et al. |
| 2010/0281510 A1 * | 11/2010 | Bichot ................... H04N 7/163 |
| | | 725/114 |
| 2010/0287298 A1 | 11/2010 | Leung et al. |
| 2011/0138379 A1 | 6/2011 | Porter et al. |
| 2011/0231888 A1 | 9/2011 | Sequeira |
| 2011/0305451 A1 | 12/2011 | Nishitani et al. |
| 2012/0230195 A1 | 9/2012 | Khivesara et al. |

OTHER PUBLICATIONS

U.S. Appl. No. 12/436,706, Non-Final Office Action, dated Dec. 23, 2012, 17 pages.
U.S. Appl. No. 12/436,706, Notice of Allowance dated Jul. 11, 2012, 11 pages.
U.S. Appl. No. 13/648,635, Non-Final Office Action, dated Jan. 6, 2014, 30 pages.
U.S. Appl. No. 13/648,635, Notice of Allowance dated Jul. 29, 2014, 13 pages.

* cited by examiner

ID
DATACASTING SYSTEM WITH INTERMITTENT LISTENER CAPABILITY

CROSS REFERENCE TO RELATED APPLICATION

This application is a continuation of U.S. patent application Ser. No. 13/648,635, filed Oct. 10, 2012, and entitled "Datacasting System With Intermittent Listener," which application is a continuation of U.S. patent application Ser. No. 12/436,706, filed May 6, 2009, and entitled "Datacasting System With Intermittent Listener," now Issued U.S. Pat. No. 8,311,048, which application claims the benefit of U.S. Provisional Patent Application No. 61/052,163, filed May 9, 2008, and entitled "Datacasting System With Intermittent Listener," the contents of which are hereby incorporated in their entirety by reference.

This application incorporates by reference the entire contents of the U.S. patent application Ser. No. 12/436,724 entitled "Datacasting System with Automatic Delivery of Service Management Capability," filed May 6, 2009.

BACKGROUND

Embodiments of the present invention relate to datacasting systems, apparatus, and methods, and more specifically, to coordinating server and client behavior for transporting a set of data objects over a unidirectional packet network under circumstances in which the set of data objects being transmitted changes over time. More specifically, embodiments of the present invention relate to systems, apparatus, and methods for transporting a data object from a server to one or more clients such that each client is able to conserve power and processing overhead by processing packets received from the network only from time to time, yet is guaranteed to receive all data objects intended for the client that are transmitted by the server. Thus, the present invention enables a datacasting system to effectively operate in a situation in which the recipients of the transported objects are intermittent listeners, that is client devices that are not listening continuously for transmission of the objects.

A number of protocols exist that are designed to facilitate the distribution of data objects (e.g., files, notifications, events, etc.) over a unidirectional network (e.g., IP multicast or broadcast, unicast UDP networks). For simplicity, such networks will be referred to generically in this description as "datacast networks," and it will be understood that the term refers to the specific networks mentioned as well as similar data distribution networks. For packet-based technologies, the distribution of data objects includes the functions of object packetizing at the server (that is, breaking a data object into multiple, smaller data packets), transmission of the packets over the network, and reassembly of the data object from the packets at the client. The data objects are typically transmitted in the context of a logical session that is identified as part of the datacast protocol.

One usage of these standard protocols in the industry is as part of a session type usually referred to as a "file carousel," in which a set of data objects provided by a server application is transmitted repeatedly by a server over a data transport network. In this situation, the server need not have knowledge (and typically would not) as to whether any particular client is receiving the data (i.e., "listening"). In this scenario, a client may begin listening to the datacast at some time after the datacast begins and, if it listens for a sufficient period of time, can accumulate the packets for each object, reassemble them and provide the objects to the client application. The packet protocols are designed so that different clients can join the datacast at arbitrary times and acquire the objects, provided the server is using a "file carousel" session or similar construct to continually retransmit the data objects for a sufficient period of time.

In some applications, the set of data objects changes over time, as an application (or the server platform, based on some policy or schedule) adds and removes objects from the datacast session. A client that has joined the session and is listening continuously (i.e., receiving most or all of the packets being sent for that session) will be able to detect the presence of the new objects. However, for some clients, continuous listening may not be feasible, or may be undesirable because it consumes excessive resources on the client. This is a particular concern for mobile datacast clients, where processing and battery resources are typically more limited than for other types of client devices.

However, a client that listens intermittently (i.e., non-continuously) must still be guaranteed to receive all data objects that have been transmitted that are intended for that client. This is a particularly important issue for datacast sessions in which objects published to a session are transmitted only for limited periods of time or in which object transmission priority is high initially but becomes lower later on.

With the existing techniques for datacast session management that are used in the industry, a client that listens intermittently to such sessions runs the risk of not receiving an object or of spending more receiver resources than is desirable in doing so. Moreover, even if objects are received, the client may not be able to determine whether it has received all of the transmitted objects that are intended to be part of a session.

What is desired are a system, apparatus, and associated methods for broadcasting data objects over a network to an intermittent listener, where such system, apparatus, and methods overcome the noted disadvantages of existing approaches.

BRIEF SUMMARY

In some embodiments, the present invention is directed to a server-client system or architecture that allows datacast applications to reliably transport data objects from a network server over a unidirectional packet network ("datacast network") to one or more clients, each of which may be listening to the packet stream at different times. Specifically, the invention is designed to allow the clients to listen intermittently to the datacast, yet still receive all of the data objects published by the server in a timely manner, and in a way that is more optimal in terms of client resource use. This ensures that listening clients can receive a complete set of the data objects broadcast while being able to conserve client processing and power resources by not requiring continuous listening by the client to the datacast. The present invention also provides benefits for situations in which clients are unable to reliably listen continuously due to network latency or bandwidth constraints, or as the result of client movement or incomplete network coverage.

In one embodiment, the present invention is directed to a method of transporting a set of data objects over a network for reception by a receiver, where the method includes obtaining the set of data objects at a server, separating each data object into one or more data packets, providing the one or more data packets for each object to a transmitter, providing receiver control data to the transmitter, the receiver control data including a value for a listener interval that represents a maximum period over which the receiver may be powered down or off, operating the transmitter to cause transmission of the receiver control data over the network for reception by the receiver, and operating the transmitter to cause transmission of the data packets over the network for reception by the receiver, wherein the transmitter is operated such that if the receiver is powered down or off for a time period less than the listener interval, then the receiver is able to receive the one or more data packets for each data object.

In another embodiment, the present invention is directed to a method of operating a client device to receive a set of data objects transmitted to the device over a network, where the method includes receiving a plurality of data packets, assembling the plurality of data packets into one or more data objects, and receiving control data, the control data including a value for a listener interval that represents a maximum period over which a client receiver may be powered down or off.

In yet another embodiment, the present invention is directed to a datacast system for transporting a set of data objects over a network, where the system includes a server platform comprising a data object packetizer for generating one or more data packets from each data object, a receiver control data generator for generating data for controlling the operation of a receiver, the control data including a value for a listener interval that represents a maximum period over which the receiver may be powered down or off, and session state data that indicates the membership of the set of objects, and a transmitter controller for controlling the operation of a transmitter that transmits the one or more data packets and the receiver control data over the network, and a client platform comprising a data object reassembler for reassembling the data object from the one or more data packets, and a listener management module for accessing the control data and in response generating instructions for controlling the operation of a receiver that receives the transmitted one or more data packets and the receiver control data over the network.

These and other advantages of the invention will be apparent to those of ordinary skill in the art by reference to the following detailed description and the accompanying drawings.

DETAILED DESCRIPTION

Figure 1:
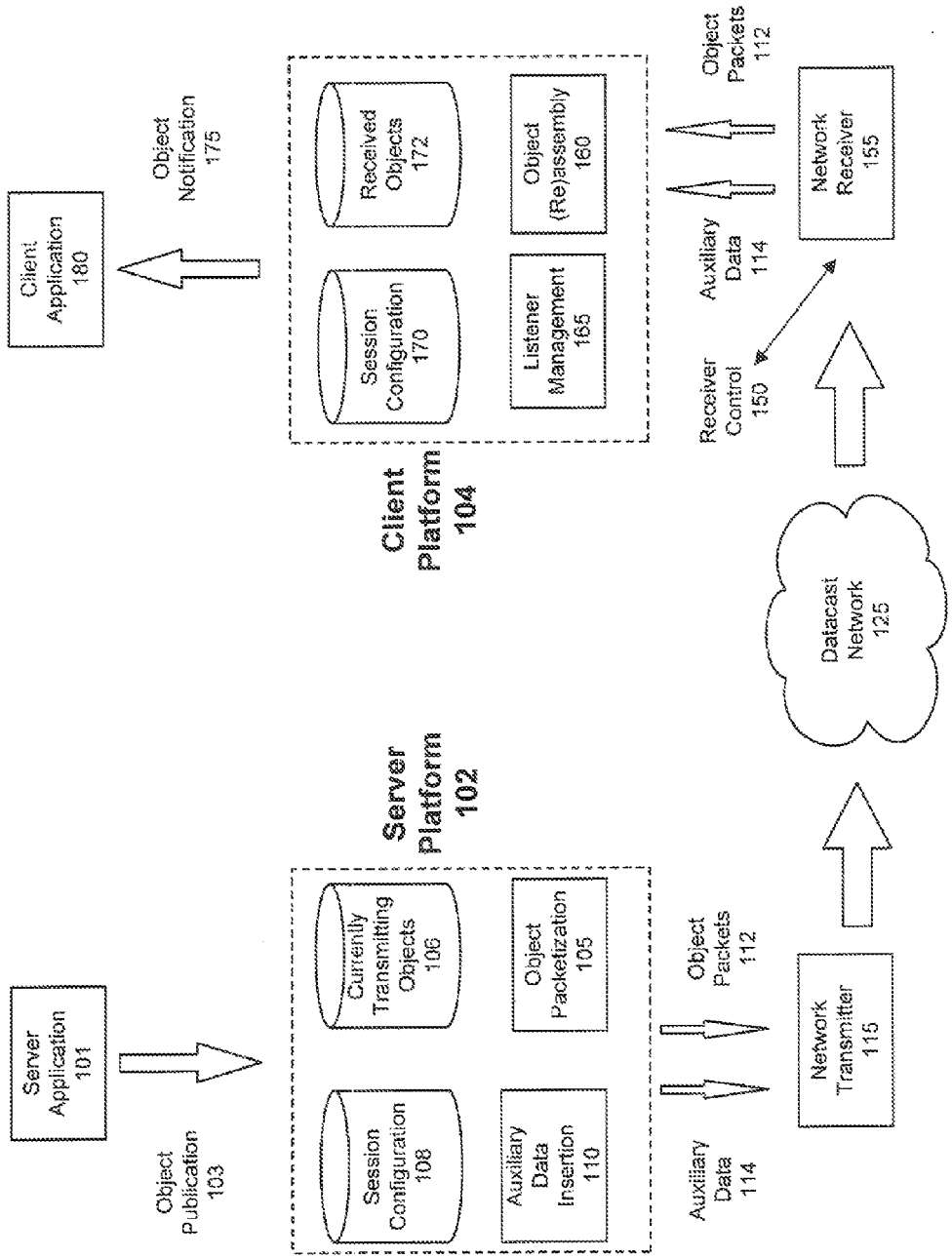
FIG. 1 is a functional block diagram illustrating the primary components of a datacast system that may be used to implement an embodiment of the present invention.

As will be described, in some embodiments, the present invention utilizes a packet-based unidirectional protocol for data object distribution. A server or server platform is responsible for packetizing and enabling the transmission (via a network transmitter in communication with the server) of data objects to one or more clients, typically transporting multiple objects within a session. The preparation of the data objects on the server and the processing of the objects after reception on the client are functions performed by applications or components that reside on the respective server or client platform. Typically, the datacast platform at the server separates the object into packets and enables their transmission over the datacast network, while the platform at the client (alone or in cooperation with a network receiver) is responsible for receiving the packets and reassembling the data objects to provide the client device with the set of transmitted data objects.

Among other scenarios, the present invention is intended for use in situations where data objects (or their transmission parameters) are transient, and there is a possibility that an intermittent listener may experience poorer delivery of data objects or receive a lower quality of service from the datacast than would a continuous listener. As noted, with existing techniques for datacast session management, a client that listens intermittently to such sessions runs the risk of not receiving an object at all or of spending more receiver resources than necessary by not detecting the high-priority transmission of a new object.

In some embodiments, the present invention is directed to a method for transporting a set of data objects from a server to one or more clients over a network, where the membership of the set can change dynamically. The method includes separating the objects into a plurality of packets, which are then transported from the server to one or more clients over the datacast network. In addition to the data objects, the server provides auxiliary or control information that is used by the client(s) to manage their intermittent listening behavior. In some embodiments, this auxiliary or control information is used by the client to determine whether it needs to expend resources to acquire newly available data objects. The auxiliary or control information may be communicated as an extension of the object transmission protocol, as part of session description data, or as a separate data stream.

In some embodiments, the default listening behavior of the client is determined in whole or in part by session description data that may be communicated between the server and client by an out of band mechanism, such as a broadcast Electronic Service Guide. The session description data typically contains information needed to establish the session at the client (for example, for a FLUTE session, the session description would include source IP address, multicast IP address and port, and Transport Session Identifier), but in accordance with the present invention, may also include additional parameters such as the expected listener interval (L), as described in greater detail elsewhere. In some embodiments, the auxiliary data stream may be used to update the session parameters, but this is not a required element in implementations of the present invention.

In a typical scenario in which the present invention might be utilized, one or more clients independently join a datacast session. Each client uses the session description to determine its listening behavior, in particular how often it must listen to the datacast to ensure receiving the object completely. In this example, reducing the required client listening time enables the client to conserve power and minimize the use of CPU processing resources while being ensured of receiving all data objects in a session.

In some embodiments of the invention, each client uses the auxiliary control information being provided by the datacast server to determine whether it is necessary to listen continuously for a period of time (i.e., temporarily) to obtain newly published data objects, and, if so, keeps the client receiver "on" until the objects are acquired and passed to the appropriate client application. Once all new objects have been acquired, the client need not (and typically would not) listen to the datacast for an interval controlled by one or more of the session description, the auxiliary information, or the session state.

In some embodiments of the invention, the client is able to detect that it has not been able to listen sufficiently often to acquire the data objects in a session (for example, when the client passes through a tunnel or moves out of the coverage area, the signal may be interrupted) and that it needs to take some action to recover any objects it may have missed. The specific action taken will depend on the configuration and application. For example, the client application may take the following actions: listen to a different session designed to support such "outage victims"; acquire a missing object via some separate mechanism, such as the use of a point-to-point network; continue without the missing object; or, leave the session altogether.

In some embodiments of the invention, an intermittent listener may combine use of a carousel with a rapid update elementary carousel to provide a relatively shorter acquisition time for updates of datacast sessions that have relatively static content.

In some embodiments of the invention, a client may support the simultaneous activity of multiple applications, and is able to optimize receiver usage while maintaining the object delivery (e.g., quality of service) guarantees to the applications.

In some embodiments of the invention, a server may provide dynamic updates to intermittent listener-related session parameters (including the listener interval, for example) with each client detecting the updates, and in response modifying its listener behavior, while maintaining the object delivery guarantees. These and other embodiments of the present invention will be described in greater detail in the following description and with reference to the indicated figures.

A number of protocols exist that are designed to assist in the distribution of data objects over a unidirectional network. These protocols typically enable a set of functions that include object packetization, transmission and reassembly. One example of such a protocol is termed Asynchronous Layered Coding (ALC) (IETF RFC 3450). This protocol instantiation makes use of the Layered Coding Transport (IETF RFC 3451) building block, which defines a mechanism for object segmentation and reassembly. An enhancement of the ALC protocol is provided by the FLUTE protocol (IETF RFC 3926), in which the server also sends a "table of contents" for the session that identifies the objects currently being transmitted as part of the session. Note that embodiments of the present invention can be used with, but are not limited to, any system that makes use of this type of object transmission, or its substantial equivalent.

Typically, applications or services that use datacast systems for data delivery follow one of two scenarios:

Offline file delivery sessions in which each client joins at some point in the distribution window and downloads all available files. Each client turns the broadcast receiver on once per session, since the files are typically not updated during the window; or Data stream sessions in which new data is continually received and must be displayed or processed, so that the receiver is always on. These sessions are similar to a media streaming session.

In either case, the receiver is "on" while the application is active. Note that the receiver may not be "on" in the sense of actively listening since some mobile broadcast technologies perform a type of time-slicing to conserve resources. However, it is the case that the receiver is in use during the time slice and the receiver is receiving all packets, potentially processing packets for objects that the client application has already received.

There are a wide range of applications for which it is detrimental for the receiver to always be powered up, since this can lead to excessive battery usage in a device such as a mobile wireless phone, PDA, or laptop computer. Examples of such applications include, but are not limited to, news updates, a stocker ticker, or video clips. However as will be described, the present invention can resolve this problem as it allows the receiver to be powered off for a much longer interval than such applications would normally be able to operate with. Although in some cases there may be a tradeoff between timely delivery (whether the client receives an object sooner or later in time) and bandwidth usage (whether transmission for a longer period is required for an object to be completely transmitted), this situation may be acceptable for some applications and use cases.

An advantage of the present invention is evident in a scenario where data objects (or their transmission parameters) are transient, and there is a possibility that an intermittent listener (IL) may experience poorer delivery quality of service (DQoS) from the datacast than would a continuous listener (or at least a poorer QoS than is desirable by the user). This situation is most likely to occur when data objects are dynamically added to, or removed from, a datacast session. For example, consider the following cases in which a listener that is not listening continuously might suffer a poorer QoS:

("event-stream") a session transmits a newly added object once reliably, then stops transmitting packets for that particular object; or ("rapid-update") a session transmits a newly added object once reliably at high priority, then at a lower priority after reliable transmission is complete.

A concept that is related to the present invention is the idea of transmitting an object "once reliably". To reassemble an object, the client must receive and reconstitute the data chunks into which the object was segmented for transmission. However, the datacast network may have an inherent packet error rate (PER), so it is typically not sufficient to send each chunk once, even to a continuously listening client. Well-known techniques are available to deal with this by having the server send additional or modified data, which may be computed by any suitable forward error correction (FEC) technique, such as Reed-Solomon coding, etc., or by simply retransmitting the packets a sufficient number of times. For "once reliable" transmission, once the object data and/or FEC or retransmitted packets have been sent, the server stops sending packets (or reduces the frequency or priority of sending packets corresponding to that object). The server chooses the FEC applied to the object packets sent during this "once reliably" period to be sufficient for a continuously listening client to receive the object with some desired probability, given the PER.

As part of the inventive solution to the problems raised by an intermittent listener (IL), the present invention introduces the concept of a listener interval (L), which in some embodiments defines the length of time over which the client is allowed to turn the receiver "off" (i.e., do nothing to receive or process packets). This turning off of the receiver is permitted at any time other than when a new object has been detected and is being acquired. As will be described, as long as the client processes the provided auxiliary or control data at least this often, it is guaranteed to be able to become aware of and receive any object that is added to the session before the object becomes unavailable or is delivered at lower priority. If the acquisition time for the auxiliary control data is $T_C$, then the receiver only needs to be powered on a fraction ($T_C/L$) of the time when updates are not occurring. Once a client detects that a new object is available, it listens continuously, and should expect to acquire the object (i.e., receive sufficient object and FEC packets to reassemble the object) within the session maximum acquisition time, $T_A$. The value of $T_A$ depends on the total amount of data currently being transmitted, and the bandwidth available to transmit. The overall fraction of time the receiver is powered on is thus roughly equal to max($T_C/L$, $T_A/T_U$,1), where $T_U$ is the average time between updates. The value selected for the listener interval (L) may depend upon one or more operational or performance criteria or variables, including, but not limited to, a desired maximum notification time for new objects for an existing listener, a maximum total number of objects to be available to a listener at one time, an expected average and maximum size of the objects, a datacast bandwidth available to the application, or a desired outage victim coverage time.

An aspect of the present invention is that the server manages the datacast in such a way as to guarantee that a client that listens more frequently than the period defined by L will be able to acquire the object in at most a time $T_A$, once it begins to listen. If the object is not acquired in this time, the client may notify its application(s) that an object may have been missed, i.e., the client is an "outage victim" (OV).

Note that this concept is different from the traditional time-multiplexing used in technologies such as DVB-H, in which a synchronized receiver power-on/off schedule is used to efficiently receive content from one or more time-slices. Such techniques are designed to provide an efficient version of "always on" behavior. In contrast, the present invention provides a way for a client to efficiently receive data objects by listening intermittently even though data is being transmitted continuously and may in fact be in the process of being acquired by other listeners. Without the benefit of the present invention, a client would continue to listen at every time-slice assigned to the datacast content; in contrast, by using the invention the client may keep the receiver power off (or at a reduced level) for periods that cover multiple time-slices. The present invention may be used synergistically with such time-slicing techniques, that is, in such situations the savings in power consumption are a result of the combination of the two techniques. Note that an explicit coordination of the two techniques is not required for the benefits of both to be obtained, though it may be advantageous to coordinate the receiver control when the listener interval is short. An important distinction between the present invention and time-slicing techniques is that in general, the intermittent listener pattern does not need to be synchronized with the time alignment of the server; the client simply begins to listen at the appropriate interval (or more frequently) after it has completed the acquisition of all new objects.

In some embodiments, the listener interval value (L) may be application-dependent, so that different datacast sessions on the same server or client employ differing values of L. An increased listener interval improves receiver power efficiency, at the cost of increasing the delay in detecting a new object. In many cases, this may be an acceptable and even beneficial tradeoff.

More precisely, when the intermittent listener (IL) technique is applied, an increase in the listener interval (L) reduces:
  power consumption by the network receiver; and
  CPU usage (and related power consumption) by the processor performing object reception.
However, this reduction comes at the cost of increasing:
  latency of notification of a new object to the client application; and
  in some cases bandwidth usage.
Roughly speaking, the receiver may reduce power consumption by a factor of ($T_C/L$), where $T_C$ is the time the receiver must be "on" to receive packets and receive the auxiliary or control information. Note that typically $T_C \ll T_A$, where $T_A$ is the worst case acquisition time for an object for an always-on listener (typically one cycle of the object carousel).

An always-on listener (assuming sufficient error correction) will notify the client application of a new object, that is, will have actually acquired the object data, in at worst an amount of time $T_A$. An intermittent listener, on the other hand, has a worst case latency of notification of ($L+T_A$), if the new object is added to the datacast session just after that client has turned its receiver off. The extent to which this increase is significant is application-dependent; many applications may operate sufficiently well even with a relatively large latency. Note that the average latency will be ($L+T_A$)/2.

The maintenance of an object on a carousel for a longer period also has a potential required bandwidth penalty. This problem typically arises in the case where new objects tend to overlap on the session, in which case an intermittent listener is not effective. The penalty for a typical case arises if the object delivery session is being multiplexed with other content, but usually the bandwidth has been allocated full-time. Even in this case, the server may choose to transmit the object at reduced bandwidth during the period corresponding to the listener interval if recovery of unused bandwidth is desirable, or may combine the new object delivery with other carousels, both of which can mitigate this impact. In making this choice, an operator is advised to take into account that an increased listener interval also guards against outages such as coverage problems that cannot be rectified by low-level error correction, and allows newly joining clients to receive recently published objects.

For example, consider a service in which news stories (e.g., text and images) are being datacast, but not continuously, so that a story is sent every 60 minutes on average. Assume that the bandwidth and maximum news item size are such that a story takes at most 120 seconds to acquire if the receiver is listening. Assume also that the server sends the auxiliary or control data that includes the value for the modified listener interval ($L-T_C$) at least once every $T_C$=30 seconds and that it takes 10 seconds to acquire that data. On average, compared to a continuously listening receiver, a listener interval value of 10 minutes would add 5 minutes to the time at which a story is received by the client application, which may not be critical for such an application. However, the receiver need only be powered on (on average):

for (30+10)/2+10 =30 seconds, 5 times every hour (to check for new content)
for (120/2) =60 seconds, once every hour (to acquire new content)

i.e., a total of 210 seconds, resulting in a reduction of about 94% compared to the always-on case.

In the example described, a news story must be broadcast for 12 minutes, while in the always-on case it may be possible to send it exactly once and remove it from the session after 2 minutes. This may reduce the overall bandwidth usage of the session, though in a system with dedicated bandwidth per session (which is typically the case) the allocation would be the same. Note that for many applications, the factor of 20 savings in client power would be more important to a solution provider and to the end user than would a latency degradation or bandwidth usage issue.

As noted, with existing techniques for datacast session management, a client that prefers (or is only able) to listen intermittently to a session runs the risk of not receiving an object at all (in the send-once case) or of spending more receiver resources than necessary by not detecting the high-priority transmission of a new object (in the rapid-update case). The present invention overcomes these disadvantages and provides an effective and resource conserving way for a client to receive data objects that are part of a datacast without having to listen continuously to the datacast.

Functional Architecture of an Exemplary System for Implementing an Embodiment of the Present Invention FIG. 1 is a functional block diagram illustrating the primary components of a datacast system that may be used to implement an embodiment of the present invention. As shown in the figure, in some embodiments the inventive system includes an object packetization component 105, an auxiliary data insertion component 110, a network transmitter component 115, a network receiver component 155, an object (re)assembly component 160, and a listener management component 165. The object packetization component 105 and the auxiliary data insertion component 110 are associated with a server platform 102 that provides data to network transmitter component 115. The object (re)assembly component 160 and the listener management component 165 are associated with a client platform 104 that receives data from a network receiver component 155. Packets are transmitted from the server to one or more clients over a datacast network 125.

As shown in FIG. 1, an object is published 103 or otherwise provided by a server application 101 to the server platform 102 which is part of the inventive system. Server platform 102 includes a data store 106 of objects that are being transmitted in the current session, in accordance with the session configuration parameters 108. Typically, the session configuration data includes parameters needed to listen to a datacast session (e.g., for FLUTE: source and destination IP address, destination port and TSI), and in some embodiments, may include parameters specific to the present invention that control intermittent listener behavior, including the modified listener interval $L-T_C$ and expected maximum acquisition time $T_A^{max}$. The object to be published 103 may be added to data store 106 or otherwise provided to object packetization element 105 that is responsible for preparing a data object for transmission over datacast network 125 by network transmitter 115. In some embodiments, the inventive system also provides auxiliary or control data to the datacast, as provided by auxiliary data insertion element 110. The data object packets 112 and auxiliary data 114 are provided to network transmitter 115 for transmission over datacast network 125.

The data object packets and auxiliary data are received by network receiver 155, some aspects of the operation of which may be controlled by signals or instructions 150 provided by the client platform 104 elements of the present invention. Network receiver 155 provides the received object packets 112 and auxiliary data 114 to the client platform 104 of the inventive system. Receiver control instructions 150 may be provided by listener management component 165 based on one or more of the current state of the sessions, the auxiliary data 114, or the session configuration data 170 reconstructed from the auxiliary data 114. These instructions control whether the receiver is actively listening for the packets on a particular session, and may be direct (power on/off) instructions, or indirect and mediated by the operating system networking layer (join/leave IP multicast group). Depending on the multicast technology in use and the presence of other applications, this will typically control whether the receiver is powered on or off.

The object packets are (re)assembled (element 160) into the data objects, and the client application 180 is notified of the availability of a new object (element 175). The object may be part of the notification itself or may be stored in a data storage (element 172) from which the application can retrieve it. The listener management component 165 controls the network receiver 155, turning it on and off based on the auxiliary data (and in some cases, the session configuration data) in accordance with methods described herein. The behavior of the listener management component is determined (in whole or in part) by the configuration of the session and the auxiliary or control data 114 received as part of the datacast. The session configuration data 170 may be obtained through a suitable synchronization mechanism with the server platform session configuration data 108 that occurs prior to, or during the datacast session itself. For this synchronization, any suitable mechanism, such as a datacast mechanism (e.g., an Electronic Service Guide) or an out-of-band mechanism (e.g., a HTTP fetch by the client of the session description data) may be employed.

Examples of Possible Mechanisms For Providing the Auxiliary/Control Data

The inventive intermittent listener technique relies on the ability of the client to discover that new objects have been added to the session, so that the listener can then be put into a continuously listening mode to acquire the object. The discovery by the client that a new object is available is made by intermittently listening to auxiliary or control information that may be transmitted by the server in one of many suitable forms. The auxiliary or control information may indicate that the receiver should listen, or may provide additional information about the currently available objects, for example to allow the receiver to handle objects that have been explicitly removed from the session. The control or auxiliary data may take any suitable form, including, but not limited to:

the re-use of information in an existing data delivery protocol (e.g., FLUTE File Description Table (FDT) version number);
an extension to a data format in an existing protocol (e.g., add sequence numbers of currently available objects to FDT);
a control data packet within an existing protocol (e.g., define control packets that include sequence number and add to ALC session as Transport Object Identifier (TOI)0);

a separate packet data stream (e.g., UDP packets on a separate port from main data session); or a separate one-to-many mechanism (e.g., FLO notification channel, broadcast SMS).

Description of Always On (AO) Versus Intermittent Listener (IL) Cases

Figure 2:
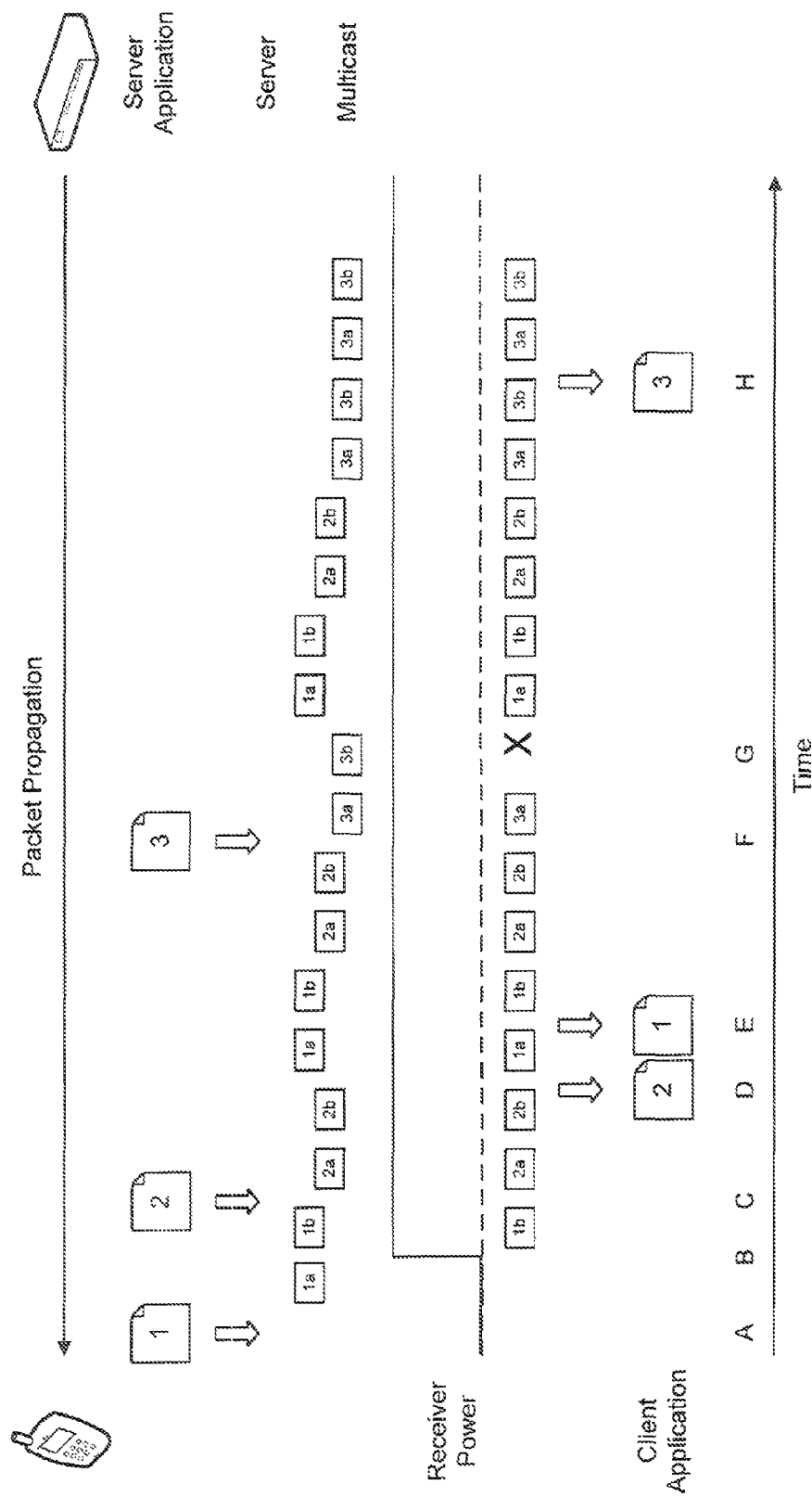
FIG. 2 is a diagram illustrating the packet flow for a server with a continuously listening client/receiver when an object is added to a typical datacast session.

One receiver mode (termed "always on") is that the receiver is always powered up and all packets, up to the reliability of the multicast technology and network data transfer capability, are received. This is schematically shown in FIG. 2, which is a diagram illustrating the packet flow for a server with a continuously listening client/receiver when an object is added to a typical datacast session, with the steps shown in the figure described in Table 1.

TABLE 1

AO Receiver Behavior (Event Stream Example)

| Step | Description |
| --- | --- |
| A | Object 1 (not necessarily the first) is published |
| B | Application joins session, client begins acquiring packets |
| C | Object 2 is published |
| D | Object 2 acquired, available to application |
| E | Object 1 acquired, available to application |
| F | Object 3 published |
| G | Object 3 packet lost in transmission |
| H | Object 3 acquired |

As shown in FIG. 2, when the server application publishes new objects, for example Object 1 at step A, Object 2 at step C, and Object 3 at step F, the server packetizes the objects into packets, for example 1*a* and 1*b* for Object 1, 2*a* and 2*b* for Object 2, and 3*a* and 3*b* for Object 3, and transmits the packets in sequence. The number of packets for an object depends on the size of the object. When a client application joins the session, the receiver is powered on, as in step B, for as long as the client is powered up. The client continues to receive all packets transmitted by the server. After all the packets for an object are received, the received packets are reassembled into the object and made available to the client application, as in steps D, E and H. Note that it is possible that one of the packets for an object may be missed due to poor reception, for example packet 3*b* or Object 3 is missed as shown in step G. In such a situation, the client continues to listen to the packets transmitted until the lost packet is recovered, as occurs in step H.

Note that for some applications, it may not be practical in terms of resource usage for the receiver to literally be on all the time, even when the user has the feel of an "always on" application. As an example, a news update or stock ticker service may be adequate if the client detects updates every few minutes instead of continuously.

In the case where updates need not be detected continuously, the client platform may take care of receiver power management by opening and closing sockets or directly turning the receiver on and off, as appropriate. However, this may mean that not all packets broadcast are actually received by the client platform.

To address this problem, in some embodiments of the present invention, the packets broadcast by the server are such that a receiver can periodically listen to the data stream (or to a different data stream) to examine an indicator or other form of auxiliary or control data from which it can determine if a new data object has been transmitted, and, if so, take actions to be able to receive the object.

As recognized by the inventors, each data object should be transmitted for at least the sum of the listener interval (L) and the maximum acquisition time $T_A$. This arrangement allows a receiver to turn on at any time within the listener interval and still receive the object. This behavior is shown schematically in FIG. 3, which is a diagram illustrating an exemplary packet flow for a server with an intermittently listening client/receiver, indicating how the server and client behave as a data object is added to a specialized datacast session, in accordance with some embodiments of the present invention. The steps shown in the figure are described with reference to Table 2. In addition to the packets for the objects (packets 1*a* and 1*b* being transmitted multiple times to provide reliable delivery of object 1, for example), the server sends an auxiliary or control data stream containing a change indicator (shown schematically as a stream 0, 0, 1, 1, 1, 2 . . . ) that indicates that a new object is available when a different number is transmitted as part of the auxiliary or control data.

TABLE 2

IL Receiver Behavior (Event Stream Example)

| Step | Description |
| --- | --- |
| A | Receiver wakes up and listens (assume session in progress) |
| B | Object 1 (not necessarily the first) is published, in this case there is a race condition with indicator |
| C | Receiver acquires change indication, 0 indicates no new objects, goes back to sleep |
| D | Object 2 is published |
| E | Receiver wakes up (some time after last change indication) |
| F | Receiver acquires change indication, 2 indicates new objects, listens for objects |
| G | Object 1 packet lost in transmission |
| H | Object 1 listener interval expires at server, sends object reliably 1 time |
| I | Object 2 acquired, available to application |
| J | Object 1 acquired, available to application |
| K | Object 1 listener interval expires at server, sends object reliably 1 time |
| M | Receiver wakes up (some time after last change indication) |
| N | Receiver acquires change indication, 2 indicates no new objects, goes back to sleep |

Figure 3:
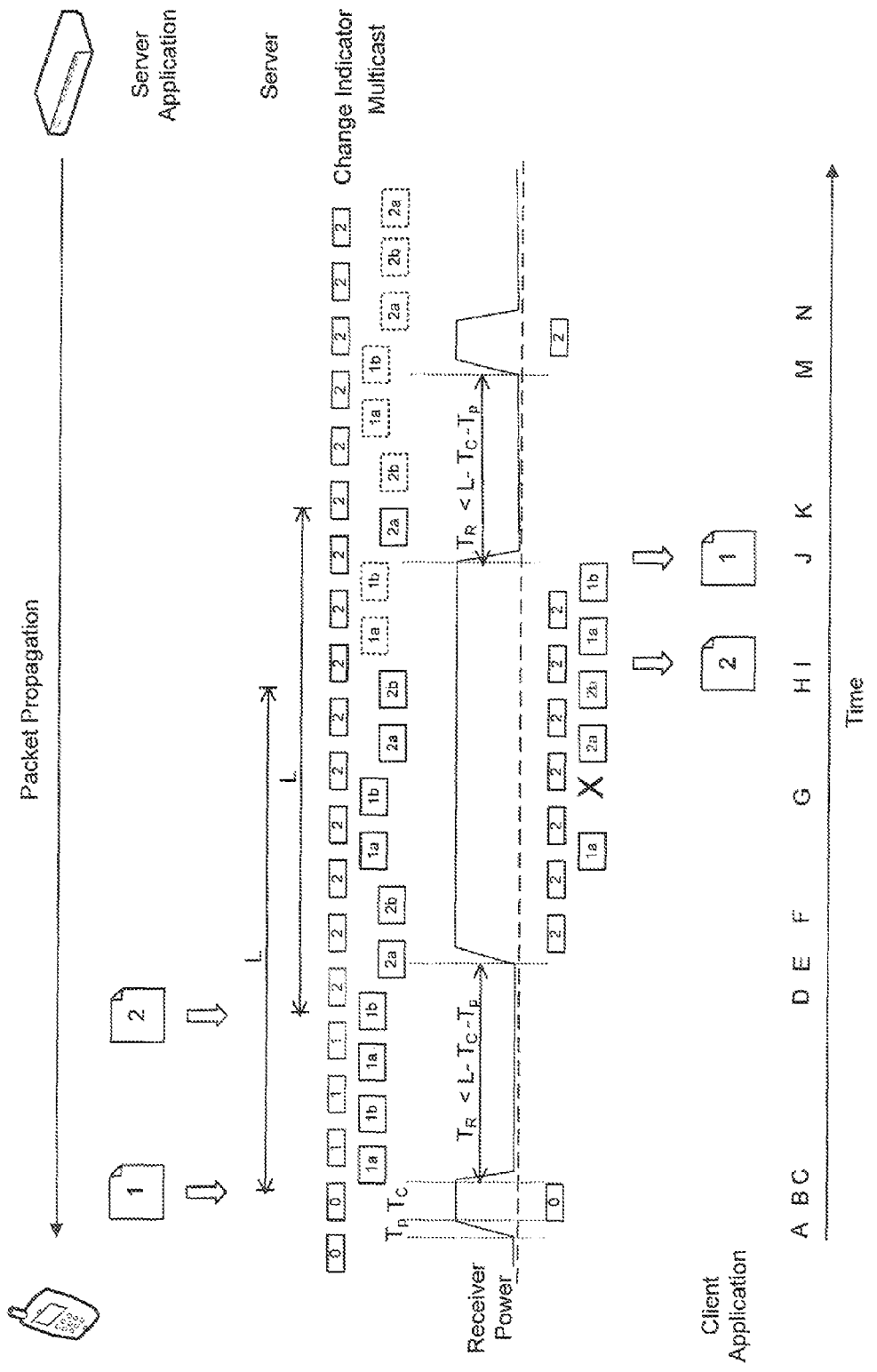
FIG. 3 is a diagram illustrating an exemplary packet flow for a server with an intermittently listening client/receiver, indicating how the server and client behave as a data object is added to a specialized datacast session, in accordance with some embodiments of the present invention.

In FIG. 3, the modified listener interval ($L-T_C$) defines the maximum time period that the receiver of a particular client can be turned off, yet still receive any objects the server adds to the session. The client modifies this value to take into account that the receiver takes finite time $T_P$ to power up, so that the receiver can be powered down for any period $T_R \leq L - T_C - T_P$. This means that from the point at which the object is first added to the session as in steps B and D (i.e., the auxiliary or control data stream 0, 0, 1, 1, 1, 2, . . . indicates new objects are available when a different number is transmitted) until a time L after that, any client participating in the one-to-many session may begin to listen and be guaranteed to reliably receive the object. The client will acquire the auxiliary or control data when the receiver is powered on as in steps A, E and M (this in itself takes some time that should be included in the listener interval L) and then, if a new object is detected, listen until the object is acquired, as in steps E to J. The object is "reliably received" in the sense defined previously for transmission "once reliably": a receiver that begins to listen continuously prior to the server's commencement of this transmission will acquire sufficient packets to reassemble the object, assuming the packet error rate (PER) does not exceed the worst case assumed by the server in determining the applied FEC. If no new object is detected, as in steps A and N, the receiver is powered off for a time interval of $L_R$ which is no longer than L. Note that in this case, the receiver is powered on for a relatively short time interval that is just sufficient to receive the change indicator data. Note also that at step M, the server may have stopped transmitting packets for Object 1; the change indicator remains at 2 since no new object is added to the session.

For any specific object, the server continues to transmit packets (or transmit them at the same high priority) even after the listener interval for that object expires, so that any client that begins to listen is still guaranteed to receive the object. It is assumed that individual packets are sent with the error correction and reliability provided by the underlying packet network, that is to say some packet error rate (PER) characteristic of the unidirectional datacast. In the present context, "reliable delivery" refers not to the low-level mechanisms for packets but to the delivery of the whole object, which could involve many packets. These packets take some time to transmit, including additional packets for error correction (in the simplest case, this may involve retransmission, but may also include well-known techniques for repair packets that can correct for more or less arbitrary missing packets). After a single "reliable transmission" has been completed in addition to the listener interval, the server may stop or de-prioritize packet transmission for the object.

In FIG. 3, this behavior can be seen for Object 1. Note that Object 1's nominal server listener interval terminates at time H, but because the receiver turned on at E (before H, but not in time to acquire the object within the nominal L), it listens until time J at which time it has accumulated the packets for Object 1. In this case, the server has transmitted the object once after the listener interval expires at the server. Note that in the example of FIG. 3, a packet was missed at G because of a network error but is repaired by retransmission. In some circumstances, it is possible that the time interval taken to acquire the object (the acquisition time $T_A$) is longer than the listener interval. Moreover, the acquisition time $T_A$ is dynamic; the listener may not know what $T_A$ is in advance, as it depends on the detailed content and bandwidth management of the session. In general, the client should listen for an interval $L_R < L$, where L has been communicated either out of band or as part of a set of auxiliary or control data. Note that a client that does not listen within the listener interval is an "outage victim" (OV) and may need to take corrective action.

Notifiable Listener (NL) Case

An optimization of the IL case is possible if the unidirectional datacast technology supports a notification mechanism that can function as a "wakeup" for the device and that can be passed to the application or platform. Examples include FLO MDNI, Broadcast app-directed SMS, and network-initiated enabling of BCMCS flow.

In this situation, the client platform does not listen to the data streams unless it receives a notification that there are new objects. After this, its behavior is the same as for the intermittent listener case (in a sense the intermittent listener case can be thought of as a primitive notification mechanism).

Listener Interval Session Parameter

As discussed, the server must cause a broadcast of the packets for a particular data object long enough for a client to detect the object and reliably acquire the packets needed to reassemble it. This is reflected in the "listener interval" parameter (L) for a session with an IL listener model; the server has to be able to assume that all intermittent listeners turn their receiver on at least this often. Once a listener is receiving packets from a data session, it must be able to acquire the object. That is, the datacast server must ensure that an object is reliably broadcast after the listener interval for that object expires; what this implies in terms of time depends on the reliability mechanism and the state of the carousel (specifically, where the object is within the carousel cycle), as will be discussed.

Even in the case of a notifiable listener, some allowance should be made for the time it takes for the notification to propagate and be processed by all receivers. Note that in either case, the listener interval used by the server should be somewhat larger than the nominal parameter to allow for receiver tuning and IP socket initialization, etc.

Session Description

The above implies that it may be beneficial for the client platform to know what listener model the server assumed when the datacast stream was generated, in order to determine if it can listen, or what the details of its listening behavior should be. This information may be part of the configuration of the session on the client side, and would normally be communicated to the client platform as part of the session description (in an Electronic Service Guide, for example) using proprietary extensions. Note that listener interval affects operational parameters such as acquisition time, publication accept/reject criteria, and QoS control.

Change Indication For Intermittent Listeners (IL)

An intermittent listener (IL) needs to be able to determine whether anything of interest happened while it was not listening (i.e., its receiver was "off"). This capability may also be useful for the NL case and even the AO case as a check on the state of the data transmission as well, even if it does not function as a primary "wakeup" mechanism.

This function may be achieved by having the server platform send a packet stream (or data embedded in existing packets) that is designed to indicate a change in the available objects. This stream should preferably be low-bandwidth but have low acquisition time, and the client platform should be able to quickly determine whether there is a need to listen to the main session. Note that the acquisition time of the change indication should be included in the listener interval for the purposes of bandwidth calculations.

Client Platform Operation

Figure 4:
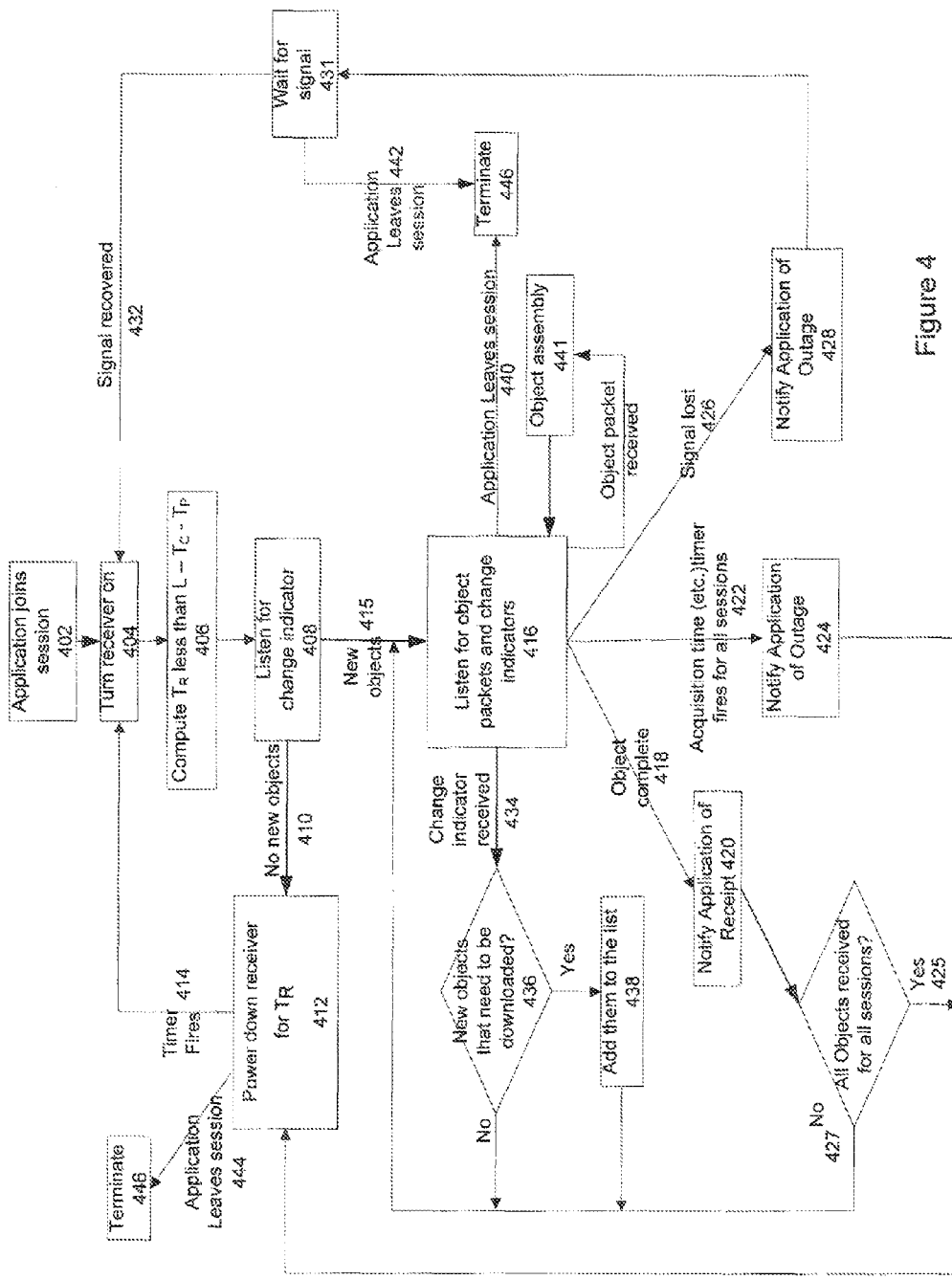
FIG. 4 is a flowchart illustrating an example of the operation of an intermittent listener for a single session, in accordance with some embodiments of the present invention.

FIG. 4 is a flowchart illustrating an example of the operation of an intermittent listener client for a single session, in accordance with some embodiments of the present invention. As shown in the figure, when an application joins the session (stage 402), it triggers the receiver to be powered on (stage 404). The receiver power-off time $T_R$ is computed to be some value less than L (stage 406) that allows for receiver power-up time and for the acquisition of the auxiliary control data, i.e., $T_R \leq L - T_C - T_P$. Note that the value of $L - T_C$ is known by the server and can be communicated to the client, but the value of $T_P$ is client-specific as it depends on the characteristics of the receiving device. The client then listens for the change indication, which as described may be part of the transmitted auxiliary or control data (stage 408). If the change indication data indicates that no new object is available (stage 410), then the receiver is powered down and a timer is set to power on the receiver again after an interval of $T_R$ (stages 412 and 414). If no change indication data is received, the intermittent listener infers that a reception outage has occurred (stage 426), and informs the application (stage 428). The application then has the option to leave the session (stage 440) in which case the intermittent listener terminates (stage 446). The application may also continue listening to the session (stages 431 and 432) by repeating the cycle in stages 404, 406 and 408. Otherwise the client listens for object packets and change indicator data until one of the following events happens: an object is received completely (stage 418), the acquisition time timer expires (stage 422), the signal is lost (stage 426), a change indicator is received (stage 434), or the application leaves the session (stage 440).

When the object is received completely (stage 418), the client application is notified (stage 420) and the object is made available to the application. If all objects have been received (the "yes" branch at stage 425), then the receiver is powered down for an interval of $T_R$ (as shown at stage 412). Otherwise, the client continues to listen for the object packet again (the "no" branch at stage 427 followed by stage 416). If the acquisition time timer expires, i.e., if the objects are not received within the specified time interval (stage 422), then the application is notified about the outage (stage 424) and the receiver is powered down for another interval of $T_R$ (as shown at stage 412). If an outage is detected before the object is received completely (as indicated by stage 426, "signal lost"), then the application is notified about the outage (stage 428). The application then has an option to leave the session (stage 440) in which case the intermittent listener terminates (stage 446); or to continue listening to the session (stages 431 and 432) by repeating the cycle in stages 404, 406, 408, and 416. If a change indicator is received (stage 434), the intermittent listener checks for any new objects that have been added to the download list (stage 436) and if there are such objects, adds them to the list (stage 438) and continues to listen for the object packets (stage 416). The application can leave the session while the receiver is powered down (stage 444). In such case, the operation of the intermittent listener terminates (stage 446). The above cycle repeats for as long as the client is powered on and the application remains in the session.

Exemplary Implementation Details For SDP and FLUTE/ALC Protocols

In the following, additional details are provided for implementation of the invention using FLUTE or ALC protocols for object transmission and session management. Typically, the use of ALC is appropriate when data objects are relatively transient (event session type) so that FDT changes are too rapid to be used as an efficient change notification mechanism.

Exemplary Description of Session

An approach for session description in media and a datacast is to distribute a Session Description Protocol (SDP) object to clients that will participate in a data delivery session, via some out-of-band mechanism such as a broadcast Electronic Service Guide. Alternatively, the session description may be made available by the server platform via HTTP or other protocol over a point-to-point network. Other protocols or formats such as PSIP binary table extensions may be used for this purpose, as will be evident to those skilled in the art.

In the example of SDP, a proprietary extension may be used to specify L and $T_A$ for a session, for example, with the following syntax:

m=application 12345 FLUTE/UDP *
    a=listener: intermittent 120
    a=listener: acquisition 400

Server Platform Operation

Another change indication mechanism that may be used with the present invention is to send the sequence number of the most recent object (SEQ), but more informative indications are useful if data objects are transient. For example, using the smallest and largest sequence number currently in the session may enable the client to avoid listening for missing objects in a session that allows object removal by applications. In other cases auxiliary data like the current acquisition time can be sent to the client.

When a standard protocol is being used for the underlying object datacast, the change indication may be combined with existing elements of the unidirectional protocol. Two exemplary implementations are based on the FLUTE and ALC protocols, and are described in the following.

Server Behavior (FLUTE protocol)

In this situation, the FDT Instance ID is used by the client as the Session SEQ. Information for currently available objects is then provided within the FDT.

Server Behavior (ALC protocol)

In the case of using ALC, the current Session SEQ needs to be conveyed to the client. It should also be possible for the client to determine SEQs of the currently transmitted objects and correlate them to the Session SEQ. One mechanism to accomplish this is to use an ALC Extension Header. A Fixed Length Header Extension field is used with the ID of, say, 179. A possible format of such a field, using 24 bits for SEQ, is:

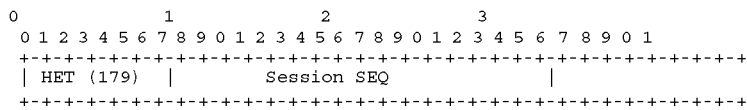

Note that the Session SEQ needs to be correlated with some information in the transmitted objects. One possibility is to use a Split TOI scheme with the "version" portion of no more than 24 bits. That "version" portion will then be interpreted by the client as the object's SEQ. Another approach is to reserve TOI 0 for a "mini-FDT" to be used for ALC sessions; the structure of mini-FDT can be as follows (note that both the minimum and maximum TOIs are included):

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Standard ALC Headers                              |
+-+-+-+-+-+-+-+-+-+-+-+-+-+-+-+-+-+-+-+-+-+-+-+-+-+-+-+-+-+-+-+-+
| max TOI length|      max TOI        | min TOI length|
+-+-+-+-+-+-+-+-+-+-+-+-+-+-+-+-+-+-+-+-+-+-+-+-+-+-+-+-+-+-+-+-+
|   min TOI         |
+-+-+-+-+-+-+-+-+-+-+-+-+-+-+
```

A possible format is the following: one byte specifying the length of the following TOI, followed by the TOI itself (of variable length, in network byte order), max TOI first, min TOI second. This format specifies the maximum and minimum TOIs of objects currently in the session. Here "maximum" and "minimum" are defined as max and min "versions" if split TOIs are used or full TOIs otherwise. Object versions (be they full TOIs or split TOI versions) are increased monotonically, i.e., there should not be two objects with the same "version".

Client IL Operation (ALC protocol)

In some embodiments, the IL client has two modes of operation: steady state and bootstrap. In steady state operation, the client has all the objects it wants prior to turning off the receiver, so the next time it wakes up (after the IL interval), it only needs to get the objects that changed during that time period. In bootstrap operation the IL client joins the session for the first time; in some ways, this mode is equivalent to the Outage Victim (OV) mode.

When data objects are added to the session, the server will communicate that fact to the client via the auxiliary or control data so that the client can determine if anything has changed on the session while its receiver was off. This provides an efficient manner of notifying the client regarding changes to the data objects being datacast. The client will learn its session configuration (IL interval and maximum Acquisition Time) from the session description, in one of the ways described.

Client Steady State Operation

When the client turns on the receiver in the steady state, it should be able to quickly determine if there were any changes to the session while it wasn't listening. To do so, it listens to the change indicator, and compares it to the one it saw the last time the receiver was turned on. For example, the SEQ value may be compared to the last seen value. If no change to the datacast session is observed (i.e., no new objects have been added to the session), the receiver is turned off for another listener interval. However, if a change to the session is indicated, then the client knows it needs to start listening to get the new data objects in the session.

If a change is indicated, the client determines which objects were added. For example, if the SEQ value was incremented each time an object was added, then the difference is the list of sequence numbers of objects added to the session while the client's receiver was turned off. By definition of the server IL behavior, all those objects are still on the carousel and can be downloaded within the acquisition time unless the application explicitly removed them. The client then listens to the session until all the objects with missed sequence numbers (or that it is otherwise interested in) are acquired. If the Session SEQ gets incremented while the receiver is turned on, the client starts listening for the newly added objects as well and only turns the receiver off when all the currently available objects are downloaded.

If some of the objects were added and removed from the session by the application while the client's receiver was turned off, then the client might encounter a "gap" within the sequence number range. This scenario may be handled by one of three approaches:

- The auxiliary data may be rich enough (e.g., FLUTE FDT) or may be augmented (e.g., add TOIs of removed files to SEQ for ALC) to express the gaps, in which case the client will not expect to receive the removed objects;
- The client may assume (since it is in steady state mode) that if it listens for the current acquisition time $T_A$, as communicated in the session description and/or auxiliary data, but does not receive an object, that the object was removed; or
- The client may assume it needs to take "outage victim" action to get the object, and discover only after taking that action that the object is no longer part of the session.

Once all the available objects are acquired, the client remembers the current change indicator status and turns off the receiver for another listener interval. Note that "all available objects" means all the objects that the client is interested in among those currently transmitted in the session.

Client Bootstrap Operation

When a client first joins the session, the client acquires the change indicator. Unlike the steady state case, the client does not know how many of the objects with earlier sequence numbers are still available as part of the session. Hence, it needs to acquire all the objects it sees as being part of the session (or that it is interested in), with a timeout used to turn off the receiver if it does not see any "new" object packets on the session for a predetermined amount of time.

In an ALC protocol embodiment, this means that the newly joined client starts checking the TOIs of the packets it gets off the network and downloads those it is interested in. If it hasn't seen any new TOIs within the Acquisition Time, it will assume that it has obtained all it could, remember the current Session SEQ and turn off the receiver for the listener interval. Note that this scenario is similar in some ways to the Outage Victim (OV) use case.

Client IL Behavior (FLUTE protocol)

The high level behavior for both the Steady State and Bootstrap cases are similar to the ALC protocol case, with a difference being that FDT Instance ID is used as Session SEQ. In this case, the client knows what objects are currently being transmitted (and which of those it does not have) and so does not need to rely on Acquisition Time to work around potential gaps in the object stream.

IL Usage With Rapid Update For Data Object Sessions

For datacast sessions with relatively static content, it can be beneficial from the acquisition time point of view to provide an "update carousel" that has a much shorter cycle time than the main carousel (referred to herein as an update or rapid update carousel). This is different from the change notification case because in this case the update includes the new object explicitly; thus, the receiver may determine the change to the data object session without listening to the main data object session if it is known that no updates have been missed. The purpose of a rapid update carousel is to reliably communicate the update, consistent with a specific receiver model. Using this technique, the server will automatically place a published object onto the data object carousel (permanently) and onto the update carousel (for one-time reliable transmission).

The client, knowing that the rapid update feature is "on" or active for a particular session, will then provide the following behavior under IL conditions:

Listen to the rapid update carousel change indication;
Determine whether update objects have been missed; and
If so, continue to listen to the update carousel to acquire the objects.

If IL behavior has been interrupted (i.e., OV conditions) or the session is being initialized, the platform would then listen to the primary carousel for a while:

Listen to both the update carousel and the data object carousel;
Notify the application of new objects on either carousel; and
Once all new objects have been delivered from the primary carousel, listen only to the update carousel.

While the basic intermittent listener (IL) method that has been described provides substantial benefits in itself, it may be modified to take into account the tradeoffs between bandwidth usage, acquisition time, receiver power consumption, and client processing load. These tradeoffs will depend on the priorities of the specific deployment of datacast services and the capabilities of the target client devices.

Multiple Session Power Optimization

In some situations, a single client device may be host to multiple applications (in which case data may be received in multiple sessions, each corresponding to a specific application), or to an application that subscribes to multiple datacast sessions. These applications or sessions would typically benefit from independent application of the intermittent listener method, but as an option, the client platform may act to optimize the receiver behavior under these conditions. If each session has an associated maximum listener interval (L), the client platform can choose a listening pattern that minimizes power-on time while still guaranteeing that the listener interval is not exceeded by any individual session. This can be accomplished by having the receiver power-on at least as often as the minimum session listener interval, but it is not necessary to process packets for all sessions each time the receiver is powered on. As with the single session case, there is no requirement that the clients synchronize receiver power-on with the server, a global clock, or other clients.

Figure 5:
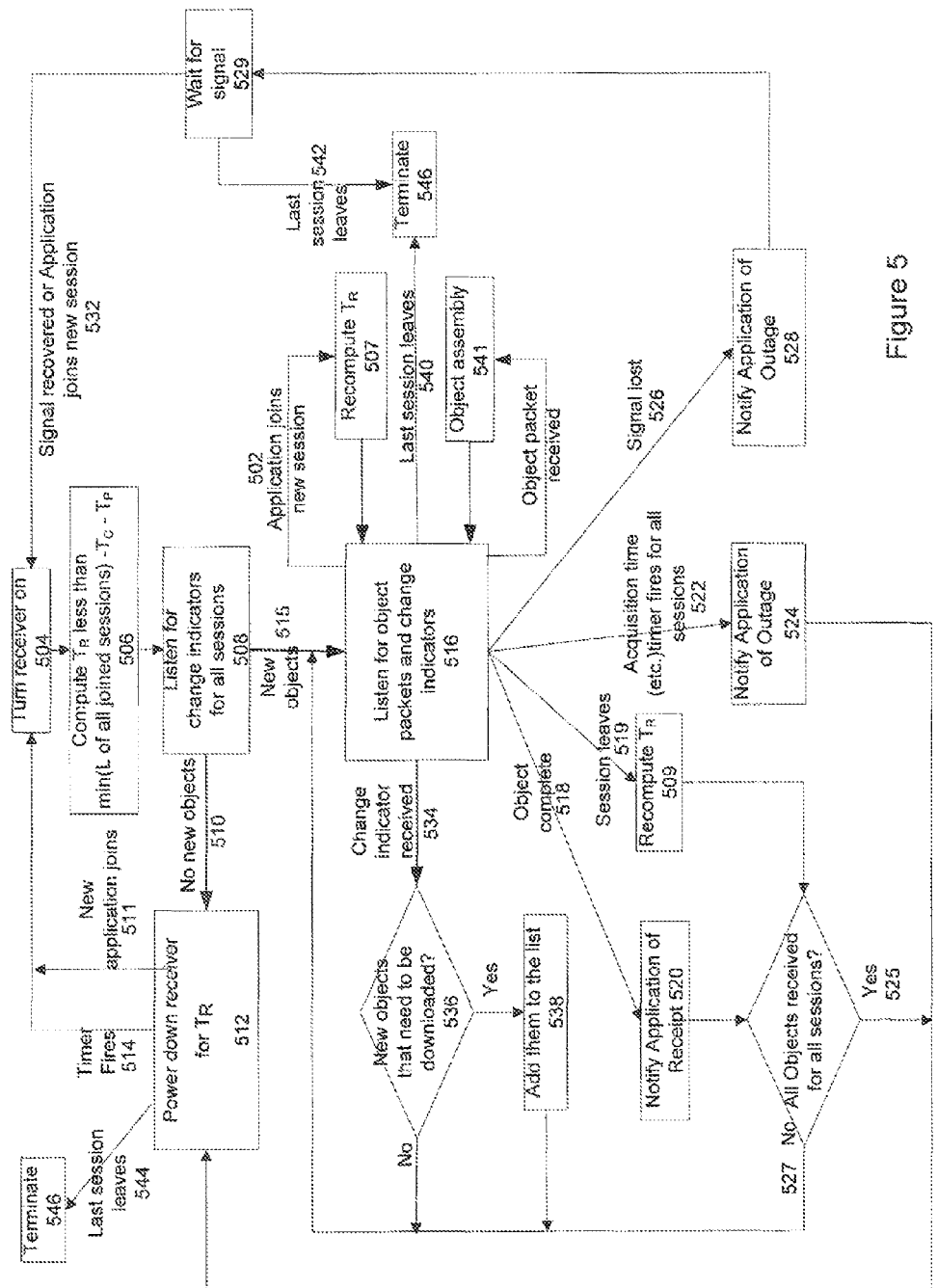
FIG. 5 is a flowchart illustrating an example of the operation of an intermittent listener for multiple sessions with optimization of the receiver power consumption, in accordance with some embodiments of the present invention.

A specific method for coordinating multiple intermittent listener sessions is shown in FIG. 5, which is a flowchart illustrating an example of the operation of an intermittent listener for multiple sessions with optimization of the receiver power consumption, in accordance with some embodiments of the present invention. Note that variations of the illustrated method are possible, as will be recognized by those skilled in the art. For example, it is not necessary to listen to all sessions when the coordinated $T_R$ timer fires, provided the receiver listens to each session for which the session listener interval would expire within the next $T_R$.

The behavior of a client supporting multiple sessions is depicted in FIG. 5. Similar to the case for supporting a single session, when an application joins the session (stage 511), it triggers the receiver to be powered on (stage 502). A difference between the situation described with reference to FIG. 5 and that of FIG. 4 is that the listener interval $T_R$ is computed to be the minimum of the listener power-down time value of all sessions (as occurs at stages 506, 507, 509). The intermittent listener then listens to the change indication (stage 508). If no new object is available (stage 510), then the receiver is powered down (stage 512) and a timer is set to power on the receiver again after an interval of $T_R$ (stage 514). Otherwise the intermittent listener listens to the object and change indicators continuously (stage 516). While listening to the object packets, several cases can happen: an object is received completely (stage 518), the acquisition time timer expires (stage 522), the signal is lost (stage 526), a change indicator is received (stage 534), an application leaves the session (stage 519), or an application joins a new session (stage 502).

When the object is received completely, the object is made available to the application (stage 520) and if all objects have been received (stage 525) then the receiver is powered down for an interval of $T_R$ (stages 512, 514); otherwise it continues to listen for the object packet again (stages 527 and 516). If the acquisition time timer expires (stage 522), the application is notified about the outage (stage 524) and the receiver is powered down for another interval of $T_R$ (stages 512, 514). If an outage is detected before the object is received completely (stage 526), the application is notified about the outage (stage 528) and the intermittent listener will wait for the signal to recover (stage 529). After the signal is recovered (stage 532), the receiver is powered on to continue listening for the object packets (stage 504). If a change indicator is received (stage 534), the intermittent listener checks if any new objects need to be added to the download list (stages 536, 538) and continues to listen for the object packets (stage 516). If an application joins a new session (stage 502), the value of $T_R$ is re-computed (stage 507) and the intermittent listener continues to listen to the object packets. Note that the new $T_R$ will not take effect until next time the receiver is powered down. The above cycle repeats for as long as the client is powered on.

An application can leave the session while the intermittent listener is listening for the object packets (stage 516), or waiting for the signal to recover (stage 529), or while the receiver is powered down (stage 512). If the last application leaves the session (stage 540, 542, 544), the operation of the intermittent listener terminates (stage 546). An application can also join a session while the intermittent listener is waiting for the signal to recover (stage 529) or while the receiver is powered down (stage 511). In these cases, the receiver is powered on immediately (stage 504) and the procedures described above take place.

Dynamic Session Parameters

In some situations, the session description and parameters associated with the session may be changed while the session is still active. Examples of session parameters that affect intermittent listener behavior may include:

listener interval; or
current acquisition time.

These, and other parameters, may be adjusted dynamically based on changes in, for example, network conditions, object type, object size, priority, or changes in other broadcast related variables that affect the previously mentioned tradeoffs. These changes may be communicated out of band, but it may be preferable to employ extensions to the auxiliary data stream that contains the change indicator to transmit updates to the session parameters.

In this example, the server provides session parameter updates within the auxiliary data stream for a datacast session, and the client side receiver updates the session parameters based on the received data. Because receivers are only guaranteed to detect the parameter change within the original listener interval, for any change that reduces listener interval or timeout behavior, the server should extend object transmission until all listeners that used the original parameters have had a chance to update, i.e., through at least one additional old listener interval.

As is apparent from the above description, the present invention provides many advantages over conventional data broadcasting techniques, allowing datacast clients to conserve processing resources and receiver power consumption while guaranteeing delivery of data objects with a specified quality of service.

A datacasting system and associated apparatus and methods have been described for efficiently managing the operation of system components sych as client resources in situations where the client devices are not continuously listening to a broadcast. The inventive system utilizes auxilliary or control information that is transmitted to client devices to inform those devices as to the listening behavior that will enable the devices to efficiently receive the transmitted data objects while conserving power and computational resources, among others.

Figure 6:
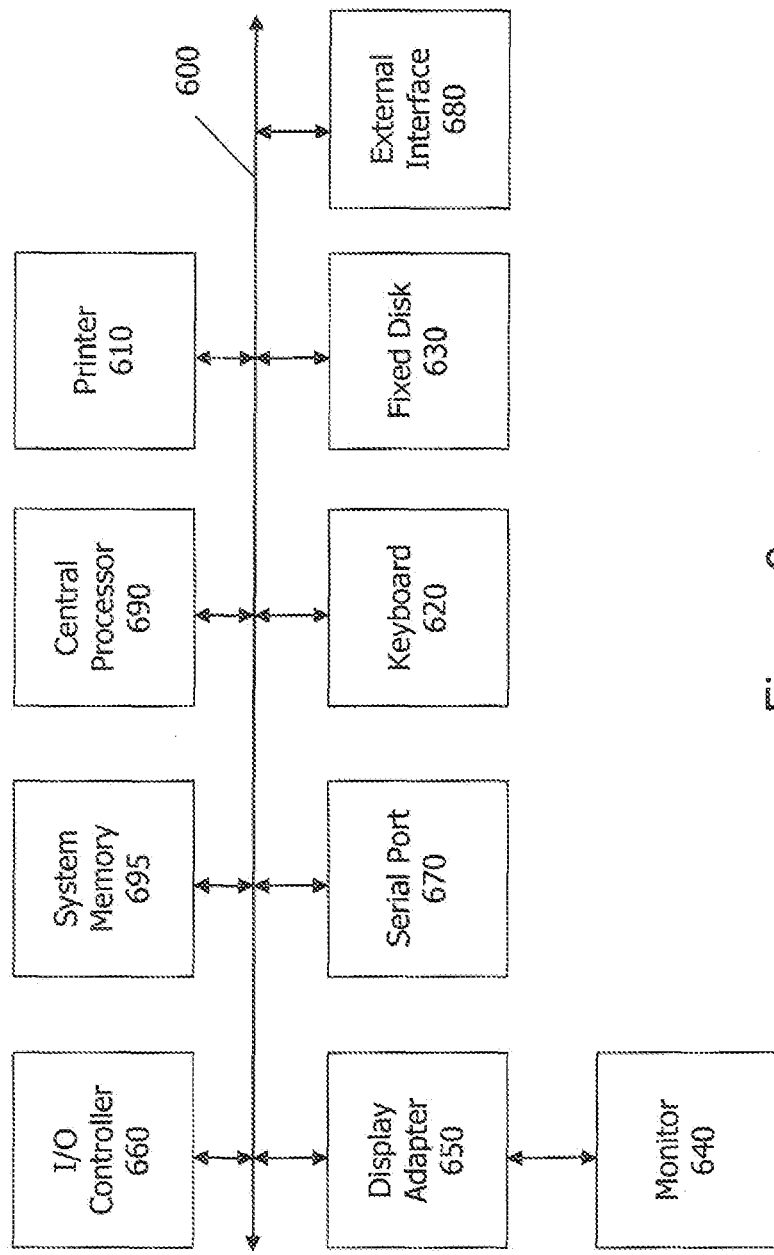
FIG. 6 is a block diagram of elements that may be present in a computer device or system configured to implement a method or process of the present invention.

In some embodiments, the inventive system, apparatus, methods, processes or operations for managing and efficiently datacasting data objects may be wholly or partially implemented in the form of a set of instructions executed by a central processing unit (CPU) or microprocessor. The CPU or microprocessor may be incorporated in an apparatus, server, client or other computing device operated by, or in communication with, other components of the inventive system. As an example, FIG. 6 is a block diagram of elements that may be present in a computer device or system configured to implement a method or process of the present invention. The subsystems shown in FIG. 6 are interconnected via a system bus 600. Additional subsystems such as a printer 610, a keyboard 620, a fixed disk 630, a monitor 640, which is coupled to a display adapter 650, and others are shown. Peripherals and input/output (I/O) devices, which couple to an I/O controller 660, can be connected to the computer system by any number of means known in the art, such as a serial port 670. For example, the serial port 670 or an external interface 680 can be used to connect the computer apparatus to a wide area network such as the Internet, a mouse input device, or a scanner. The interconnection via the system bus 600 allows a central processor 690 to communicate with each subsystem and to control the execution of instructions that may be stored in a system memory 695 or the fixed disk 630, as well as the exchange of information between subsystems. The system memory 695 and/or the fixed disk 630 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an" or "the" is intended to mean "at least one," unless specifically indicated to the contrary.

What is claimed is:

1. A method of transporting a set of data objects over a network for reception by a receiver, comprising:
   obtaining the set of data objects at a server;
   separating each data object into one or more data packets;
   providing the one or more data packets for each data object to a file carousel, wherein the file carousel provides each respective packet of the one or more data packets to a transmitter for a respective time duration, each respective time duration for the one or more data packets included in a cycle of the file carousel;
   providing receiver control data to the transmitter, the receiver control data including:
   a value for a listener interval that represents a maximum period of time over which the receiver may be powered down or off, wherein multiple additional data packets for multiple additional data objects are added to the carousel during the listener interval, and
   a change indicator indicating that the multiple additional data objects are added to the set of data objects and that one or more additional data packets for the additional data objects are added to the file carousel, wherein the change indicator indicates to the receiver to check for the multiple additional data packets;
   operating the transmitter to cause transmission of the receiver control data over the network for reception by the receiver; and
   operating the transmitter to cause transmission of the data packets over the network for reception by the receiver, wherein the transmitter is operated such that each respective packet of the one or more data packets is available for transmission for the respective time duration included in the cycle, each respective time duration occurring during the maximum period of time represented by the listener interval,
   wherein each of the multiple additional data packets are available for transmission for the period of time represented by the listener interval and the change indicator indicates to the receiver to continue to listen to the transmitter until each of the multiple additional data packets are received, and
   wherein each of the multiple additional data packets are removed from the file carousel after completion of the period of time represented by the listener interval.

2. The method of claim 1, further comprising operating the transmitter to cause transmission of session state data that indicates the data objects contained in the set of data objects.

3. The method of claim 1, wherein at least some of the receiver control data is provided as part of the transmission of the data packets.

4. The method of claim 1, wherein at least some of the receiver control data is provided in a separate transmission from the data packets.

5. The method of claim 1, wherein at least some of the receiver control data is provided over a different network from the network used for the transmission of the data packets.

6. The method of claim 1, wherein at least some of the receiver control data is obtained by the receiver at a time prior to, or during, the transmission of the data packets.

7. The method of claim 1, wherein at least some of the receiver control data is configured in advance by a client application or provided by a user of the application.

8. The method of claim 1, wherein the receiver control data is provided as data elements used as part of a protocol used to transmit the data packets.

9. The method of claim 1, wherein the receiver control data further comprises data indicating a change in membership of the set of objects transmitted in response to an object being added to or removed from the set currently being transmitted.

10. The method of claim 1, wherein the receiver control data further comprises data indicating a change in a session parameter.

11. The method of claim 1, wherein the data packets for a particular data object are transmitted for a period equal to or greater than a sum of the listener interval and a time period sufficient for transmission of the particular data object once reliably.

12. The method of claim 11, wherein the data packets for the particular data object are removed from the file carousel after the listener interval and subsequent reliable transmission are completed.

13. The method of claim 1, wherein a value for the listener interval is determined based on one or more of a desired maximum notification time for new data objects for an existing listener, a maximum total number of data objects to be available to a listener at one time, an expected average and maximum size of the data objects, a datacast bandwidth available to an application, or a desired outage victim coverage time.

14. A datacast server platform, comprising:
a processor configured to execute a set of instructions;
a memory configured to store the set of instructions; and
a set of instructions stored in the memory, wherein executed by the processor, the set of instructions implement a method to:
obtain a set of data objects from an application;
separate each data object into one or more data packets;
provide the one or more data packets for each data object to a file carousel, wherein the file carousel provides each respective packet of the one or more data packets to a transmitter for a respective time duration, each respective time duration for the one or more data packets included in a cycle of the file carousel;
provide receiver control data to the transmitter, the receiver control data including:
a value for a listener interval that represents a maximum period of time over which a receiver may be powered down or off, wherein multiple additional data packets for multiple additional data objects are added to the carousel during the listener interval, and
a change indicator indicating that the multiple additional data objects are added to the set of data objects, wherein the change indicator indicates to the receiver checks for the multiple additional data packets based on the change indicator, and;
operate the transmitter to cause transmission of the receiver control data over a network for reception by the receiver; and
operate the transmitter to cause transmission of the data packets over the network for reception by the receiver, wherein the transmitter is operated such that each respective packet of the one or more data packets is available for transmission for the respective time duration included in the cycle, each respective time duration occurring during the maximum period of time represented by the listener interval,
wherein each of the multiple additional data packets are available for transmission for the period of time represented by the listener interval and the change indicator indicates to the receiver continues to listen to the transmitter until each of the multiple additional data packets are received, and
wherein each of the multiple additional data packets are removed from the file carousel after completion of the period of time represented by the listener interval.

15. The datacast server platform of claim 14, wherein at least some of the receiver control data is provided over a different network from the network used for the transmission of the data packets.

16. The datacast server platform of claim 14, wherein at least some of the receiver control data is obtained by the receiver at a time prior to, or during, the transmission of the data packets.

17. The datacast server platform of claim 14, wherein at least some of the receiver control data is configured in advance by a client application or provided by a user of the application.

18. The datacast server platform of claim 14, wherein the data packets for a particular data object are transmitted for a period equal to or greater than a sum of the listener interval and a time period sufficient for transmission of the particular data object once reliably.

19. The datacast server platform of claim 18, wherein the data packets for the particular data object are removed from the file carousel after the listener interval and subsequent reliable transmission are completed.

20. The datacast server platform of claim 14, wherein a value for the listener interval is determined based on one or more of a desired maximum notification time for new data objects for an existing listener, a maximum total number of data objects to be available to a listener at one time, an expected average and maximum size of the data objects, a datacast bandwidth available to an application, or a desired outage victim coverage time.

* * * * *